(12) United States Patent
Odhner

(10) Patent No.: US 7,018,041 B2
(45) Date of Patent: Mar. 28, 2006

(54) COSMETIC HOLOGRAPHIC OPTICAL DIFFRACTIVE CONTACT LENSES

(75) Inventor: Jefferson E. Odhner, Amherst, NH (US)

(73) Assignee: Luckoff Display Corporation, Columbus, OH (US)

( * ) Notice: Subject to any disclaimer, the term of this patent is extended or adjusted under 35 U.S.C. 154(b) by 0 days.

(21) Appl. No.: 10/859,418

(22) Filed: Jun. 2, 2004

(65) Prior Publication Data

US 2005/0270474 A1   Dec. 8, 2005

(51) Int. Cl.
  *G02C 7/04* (2006.01)
(52) U.S. Cl. .................. 351/162; 351/165; 351/177
(58) Field of Classification Search ............ 351/160 R, 351/162, 163, 165, 177; 359/14, 15, 19, 359/20, 22–25
See application file for complete search history.

(56) References Cited

U.S. PATENT DOCUMENTS

| 3,744,911 | A | * | 7/1973 | Stetson et al. | 356/458 |
| 4,889,421 | A | * | 12/1989 | Cohen | 351/162 |
| 5,255,108 | A | * | 10/1993 | Narayan et al. | 359/18 |
| 6,139,147 | A | * | 10/2000 | Zhang | 351/161 |
| 6,626,534 | B1 | * | 9/2003 | DiMartino | 351/160 H |

* cited by examiner

*Primary Examiner*—Huy Mai
(74) *Attorney, Agent, or Firm*—Mueller and Smith, LPA

(57) ABSTRACT

A contact lens has an inner surface adapted to be placed against the eye of a wearer and an outer surface bearing a cosmetic holographic optical diffraction grating that, when worn by a wearer, displays color to an observer of the contact lens. The holographic optical diffraction grating can diffract incident light to display one or more colors to the observer, or can be formed as an alphanumeric character(s) or graphic display to the observer.

18 Claims, 2 Drawing Sheets

COSMETIC HOLOGRAPHIC OPTICAL DIFFRACTIVE CONTACT LENSES

CROSS-REFERENCE TO RELATED APPLICATIONS

None

STATEMENT REGARDING FEDERALLY SPONSORED RESEARCH

Not applicable.

BACKGROUND OF THE INVENTION

The present invention generally relates to contact lens and more particularly to the use of holographic optical diffractive optics to provide a myriad of cosmetic looks to the contact lens.

Colored contact lenses have become popular in the last few years. They have the ability to change the color of the wearer's eyes by tinting the iris. The contacts either can have power to correct vision deficiency or no power for not affecting the wearer's vision. Any age group whose members can wear contact lenses (or simply, "contacts") can wear such colored contact lenses, for example, an actor when the script calls for a certain eye color that that the actor does not possess.

Heretofore, U.S. Pat. No. 4,995,714 proposes contact lenses that utilize phase zone plate optics, such as phase zone plate bifocals and "tuned" Fresnel lenses making use of concentric annular zones. As such the contact lenses are diffractive multifocal optical elements comprising a phase zone plate of a Cohen lens design containing rotationally symmetrical, curved repetitive patterns designed to operate at a specific wavelength.

U.S. Pat. No. 5,100,226 proposes contact lenses in which the optical power of the lens is at least partially obtained by utilizing the diffractive effect and at least a part of that diffractive effect is utilized to enable the lens to have the ability to emulate a toroidal or cylindrical lens.

U.S. Pat. No. 5,104,212 proposes a diffractive contact lens in relief that includes a smoothing layer of optically transparent material having a smooth outside surface and which is placed over the optical surface so as to immerse the relief.

U.S. Pat. No. 5,699,142 proposes a diffractive, multifocal ophthalmic lens including an apodization zone with echelettes having smoothly reduced step height to shift the energy balance from the near image to the distance image.

U.S. Pat. No. 6,139,146 proposes an ophthalmic lens, which uses a volume HOE (holographic optical element) to provide optical power.

U.S. Published Application No. 2001/0050751 A1 proposes an optical lens having a combination of a volume holographic optical element that provides a diffractive optical power.

BRIEF SUMMARY OF THE INVENTION

The present invention enables color contact lenses by means of a diffraction grating, as opposed to tints in the contact material. Although such contact lenses primarily are aimed at a cosmetic use, they also can be used to attenuate the light to make "contact sunglasses". The design can be such that simply rotating the contact lens can change the amount of attenuation.

A contact lens, then, has an inner surface adapted to be placed against the eye of a wearer and an outer surface bearing a cosmetic holographic optical diffraction grating that, when worn by a wearer, displays color to an observer of the contact lens. The holographic optical diffraction grating can diffract incident light to display one or more colors to the observer, or can be formed as an alphanumeric character(s) or graphic display to the observer.

BRIEF DESCRIPTION OF THE DRAWINGS

For a fuller understanding of the nature and advantages of the present invention, reference should be had to the following detailed description taken in connection with the accompanying drawings, in which.

The drawings will be described in greater detail below.

DETAILED DESCRIPTION OF THE INVENTION

The inventive contact lens enables the contact lens wearer to change the color of the wearer's eyes via the cosmetic holographic optical diffraction (hereinafter, "CHOD") grating or pattern applied to the contact lens. Such cosmetic color change can range from the generation of a single color, the generation of multiple colors depending upon view angle, the generation of complex color dispersions, the generation of alphanumeric characters, the generation of graphic images, or the attenuation of light to act as sunglasses. Thus, the CHOD inventive contact lens gives the wearer wide latitude in tailoring the wearer's look or image.

Figure 1:
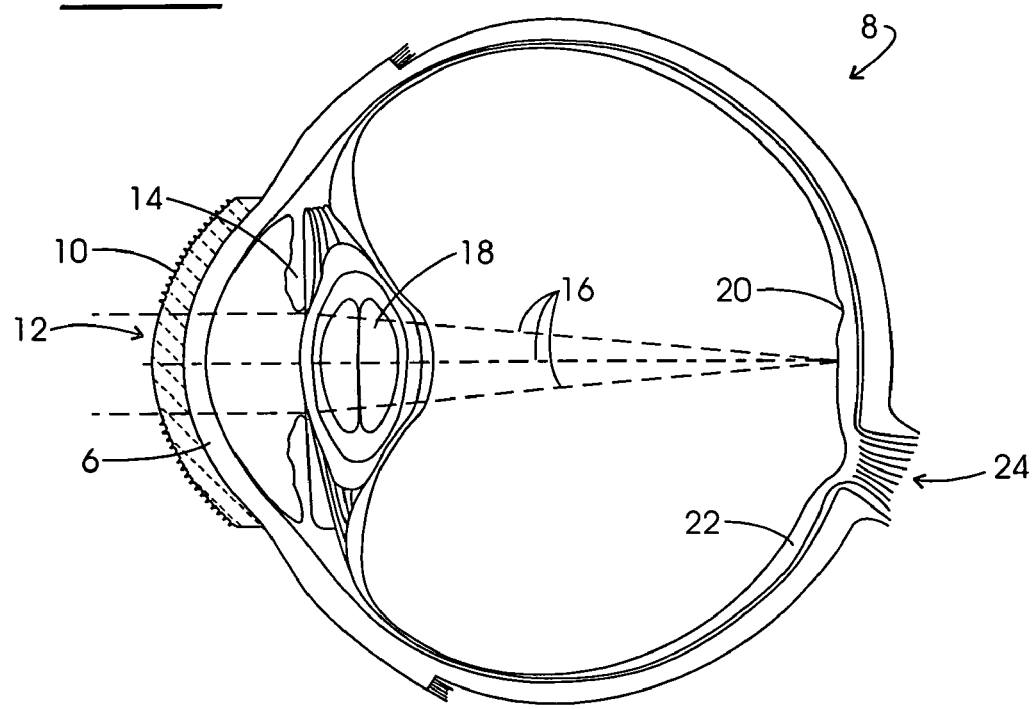
FIG. 1 shows the human eye in simplified cross-section wearing the inventive contact lens bearing the cosmetic holographic optical diffraction grating.

A view of how the contact lens is placed on a cornea, 6, of an eye, 8, is shown in FIG. 1. A diffraction grating, 10, placed on or in a contact lens, 12, has the effect of taking the white light that strikes diffraction grating 10 and dividing (diffracting) that light up into multiple colors. These colors are dispersed widely in angular space for a tightly spaced grating and narrowly for a less tightly spaced grating. An observer who views contact lens 10 will see the "color" of user's eye 8 as a color of the rainbow dependent on the viewing angle and the angle from which the illumination beam strikes contact lens 12.

Grating 10 can be designed so that the observer sees a rainbow of colors or the observer sees a single color over a wide angle. The design is such that the wearer does not perceive any change in the wearer's vision from normal contact lenses when CHOD contact lens 12 is worn. This feature is accomplished by making CHOD grating 10 annular in shape to leave contact lens 12 transparent over the iris, 14, so that light, as represented by rays 16, pass through the eye lens, 18, and strike the fovea, 20 of eye 8, from where retina, 22 and optic nerve, 24, carry the "light" to the brain of the wearer.

Figure 2:
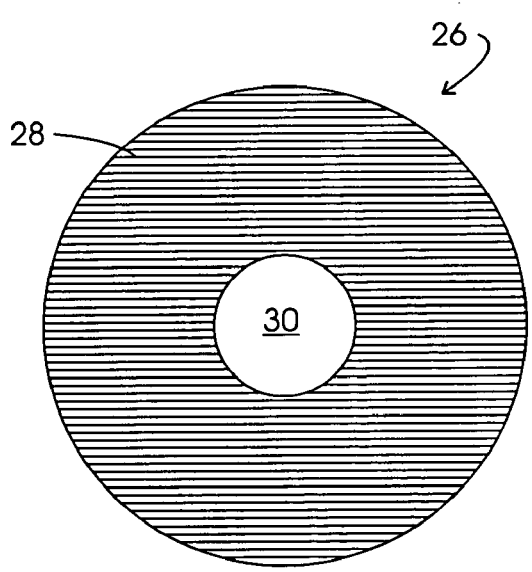
FIG. 2 is a plan view of the contact lens with a simple annular cosmetic holographic optical diffraction grating surrounding a clear pupil aperture.
Figure 3:
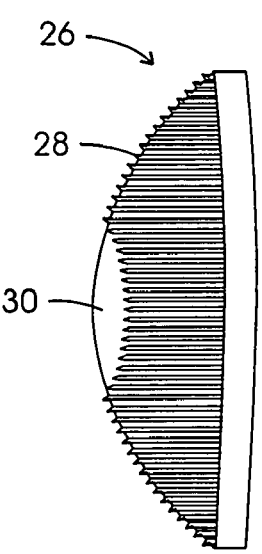
FIG. 3 is a side view of the contact lens of FIG. 2.

The nature of the grating either may be a simple grating, compound grating with multiple exposures, or grating dots where the orientation of each dot diffracts the same color or a different color. Referring now to FIGS. 2 and 3, a contact lens, 26, bears an annular CHOD grating, 28, which surrounds a clear or transparent pupil area, 30. The thickness of contact lens 26 is uniform so that contact lens 26 does not impart power to the eye. These colors diffracted by CHOD grating 28 are dispersed widely in angular space for a tightly spaced grating and narrowly for a less tightly spaced grating. Thus, an observer of contact lens 26 worn by a wearer could be essentially the same color regardless of viewing angle, or might change color based on the observer's viewing angle. It also is possible to apply CHOD grating 28 to a prescription contact lens wherein pupil area 30 is ground to correct the vision of the wearer.

Since CHOD grating 28 desirably does not extend over pupil viewing area 30, it will not interfere with any vision correction in pupil viewing area 30. One objective of the CHOD is that it impart no power or adverse effect on the wearer. Keeping the grating off the pupil will assure this. However, certain gratings, when placed over the pupil will not diffract light into the eye and, thus, have no effect on the wearer. In these cases, the grating can extend over the pupil.

Figure 4:
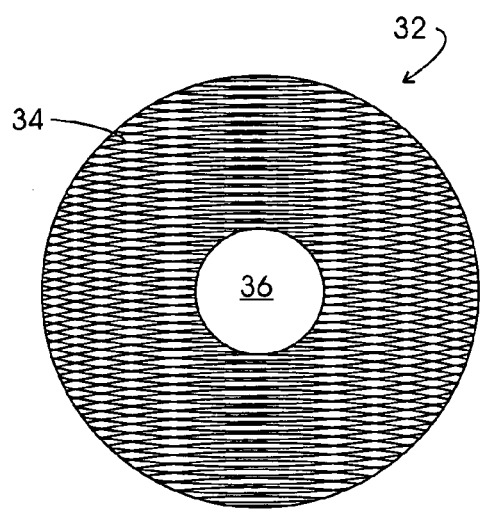
FIG. 4 is a plan view of the contact lens with multiple annular cosmetic holographic optical diffraction gratings for generating complex color dispersions, wherein the pupil area is transparent.

Referring to FIG. 4, a contact lens, 32, bears an annular CHOD grating, 34, surrounding a pupil viewing area, 36. In FIG. 4, however, annular CHOD grating 34 is a compound grating. A compound grating alleviates some of the grating orientation dependence of simple CHOD grating 34 and allows for complex color reconstructions. The complex color reconstruction is accomplished by superimposing multiple simple gratings on top of each other. When a holographic master is produced (commonly on a photoresist), it can record multiple interference exposures. Multiple holograms can be put on the same sheet or file right on top of each other. When developed, each grating will reconstruct a color scheme based on the geometry of the set up used to make that grating. The combination of these simple gratings makes complex gratings that can produce unusual color combinations.

Figure 5:
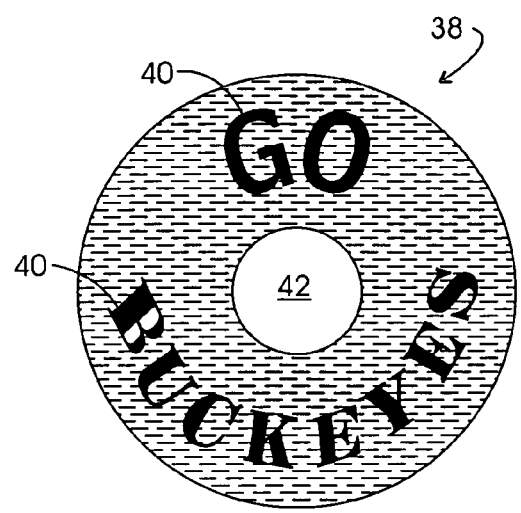
FIG. 5 is a plan view of the contact lens with a computer-generated holographic optical diffraction pattern formed by a dot matrix holographic printer, wherein the pattern spells, "Go Buckeyes", wherein the pupil area is transparent.

Referring to FIG. 5, a contact lens, 38, bears an annular CHOD grating, 40, spelling "GO BUCKEYES", surrounding a pupil viewing area, 42. In FIG. 5, however, annular CHOD grating 40 is formed form a series of grating dots. Grating dots can be positioned and oriented on contact lens 38 so that any arbitrary words, symbols, or even photographs, can be reconstructed by the contact lens in full color. For a given reconstruction angle, each grating dot reconstructs a fixed color. When the grating dot is put down at a different rotation, a different color is reconstructed. Thus, in an array of grating dots, the orientation can be such that they reconstruct any pattern such as a school logo, team logo, a yin-yang symbol, spirals, facets, paisleys, Mandelbrot sets, or even a small 2D or 3D holograms. Thus, virtually any alphanumeric character or graphic image can be formed from CHOD grating dots on a contact lens.

Figure 6:
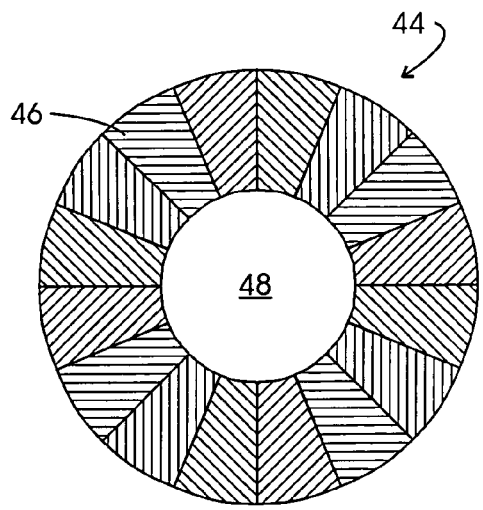
FIG. 6 is a plan view of the contact lens with annular faceted holographic optical diffraction gratings surrounding the transparent pupil area, wherein each facet has a different orientation angle for generating a different color.

Referring to FIG. 6, a contact lens, 44, bears an annular CHOD grating, 46, surrounding a pupil viewing area, 48. In FIG. 6, however, annular CHOD grating 46 is faceted, i.e., a series of facets, each of which has a different orientation angle. Even if each of the facets has the same spatial frequency, as the facets are rotated, an observer at a fixed viewing angle will see different colors produced by that facet over a limited angle of rotation.

Figure 7:
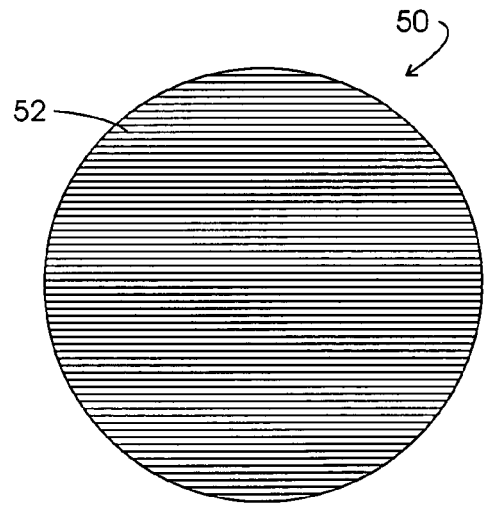
FIG. 7 is a plan view of the contact lens with the holographic optical diffraction grating covering the pupil, wherein the sun is attenuated by a simple rotation of the contact lens.

Referring to FIG. 7, a contact lens, 50, bears a CHOD grating, 52, which grating extends over the entire outside surface of contact lens 50. In FIG. 7, however, CHOD grating 52 attenuates ambient incident light. By manually rotating contact lens 50, the amount of attenuation can be controlled, thereby creating "dark glasses" from contact lens 50. The wear, then, can manually adjust the "darkness" or amount of light attenuation depending upon ambient conditions. Manual adjustment, then, is relatively simple and can be accomplished multiple times over the day. This grating over the pupil may give the user a comparable effect to photochromic lenses, which darken in the sunlight, but it does not have the disadvantage that photochromic glass in that it does not become dark in cold weather.

The CHOD grating can be made in the following manner. A photo-resist is placed uniformly over a mandrel that is used to make contact lenses. The photo-resist is exposed with a reference and object beam/beams that give the desired result. A concave nickel master is made that is the same shape as the contact lens. This nickel master then is used to emboss the contact lens so that the grating is imprinted into the contact lens material. The grating then is metalized so that the grating becomes reflective and then overcoated to protect the metallization layer. Alternatively, the metalized grating can be sandwiched in the contact lens. This would have the advantage of isolating any metal from the eye, although the overcoat should be sufficient to protect the eye from the metallization layer. The metallization layer is only a few hundred angstroms thick and can be one or more of aluminum or gold. Other metallization metals and dyes would create different effects on the contact lenses. The grating is exposed onto a curved surface. In order to get a uniform grating, the wavefronts striking the surface also should be curved. Unusual dispersion patterns can be obtained by varying the shape of the wavefronts making the exposure and by multiple exposures.

With overhead halogen lamps commonly found in night clubs or in sunlight, the effect of someone wearing contact lenses with a CHOD grating on them would be that rainbow colors would diffract from their eyes and those colors would change as either the wearer or the observer would move their head. These contacts could correct vision or have no effect on the wearer's vision. The ability to make holograms from any image using a dot matrix holographic printer would allow school logos or messages to be reflected in full color from the wearer to the observer's eyes. This could even be used as advertisements and would be inexpensive enough to be a "give-away" or promotional item. The ability to variably attenuate sunlight would allow the users to not only eliminate the need for sunglasses but also allow them to vary the amount of attenuation by rotating the contact when the wearer came indoors. The dispersion on such diffractive sunglasses would be high enough that the rainbow effect in the eyes would not be noticeable.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. A contact lens that, when worn by a wearer, displays color to an observer of the contact lens, which comprises:
    a contact lens having an inner surface adapted to be placed against the eye of a wearer and an outer surface bearing a cosmetic holographic optical diffraction (CHOD) grating that, when worn by a wearer, displays color to an observer of the contact lens.

2. The contact lens of claim 1, wherein said CHOD grating is annular in shape with a transparent iris center.

3. The contact lens of claim 1, wherein said CHOD grating is one or more of a simple grating, a multiple grating, or a faceted grating.

4. The contact lens of claim 1, wherein said CHOD grating comprises a series of dots, which form one or more of an alphanumeric character or a graphic image.

5. The contact lens of claim 4, wherein said CHOD grating comprises a light attenuation grating.

6. The contact lens of claim 1, wherein colors generated by said CHOD grating are one or more of dispersed widely in angular space for a tightly spaced grating or narrowly for a less tightly spaced grating.

7. A method for a wearer of contact lens to change eye colors, which comprises:
    placing contact lens over the wearer's eye, wherein said contact lens has an inner surface adapted to be placed against the eye of a wearer and an outer surface bearing a cosmetic holographic optical diffraction (CHOD) grating that, when worn by a wearer, displays color to an observer of the contact lens.

8. The method of claim 7, wherein said CHOD grating is annular in shape with a transparent iris center.

9. The method of claim 7, wherein said CHOD grating is one or more of a simple grating, a multiple grating, or a faceted grating.

10. The method of claim 7, wherein said CHOD grating comprises a series of dots, which form one or more of an alphanumeric character or a graphic image.

11. The method of claim 10, wherein said CHOD grating comprises a light attenuation grating.

12. The method of claim 7, wherein colors generated by said CHOD grating are one or more of dispersed widely in angular space for a tightly spaced grating or narrowly for a less tightly spaced grating.

13. A method for making a contact lens, which displays a color to an observer of said contact lens having an inner surface and an outer surface, which comprises:
    applying a cosmetic holographic optical diffraction (CHOD) grating to the contact lens outer surface, so that, when worn by a wearer, said contact lens displays color to an observer of the contact lens.

14. The method of claim 13, wherein said CHOD grating is annular in shape with a transparent iris center.

15. The method of claim 13, wherein said CHOD grating is one or more of a simple grating, a multiple grating, or a faceted grating.

16. The method of claim 13, wherein said CHOD grating comprises a series of dots, which form one or more of an alphanumeric character or a graphic image.

17. The method of claim 16, wherein said CHOD grating comprises a light attenuation grating.

18. The method of claim 13, wherein colors generated by said CHOD grating are one or more of dispersed widely in angular space for a tightly spaced grating or narrowly for a less tightly spaced grating.

* * * * *